United States Patent [19]

Bhargava et al.

[11] Patent Number: 5,655,568

[45] Date of Patent: Aug. 12, 1997

[54] PASSIVE FLOW REGULATING DEVICE

[76] Inventors: Raj Bhargava; Niraj Chandra, both of 301 E. Fireweed Ln., Anchorage, Ak. 99503

[21] Appl. No.: 512,456

[22] Filed: Aug. 8, 1995

[51] Int. Cl.[6] .................................................. F16K 37/00
[52] U.S. Cl. .......................... 137/557; 137/559; 251/65; 73/861.57
[58] Field of Search .................................. 137/557, 559; 251/65; 73/861.53, 202, 861.57, 861.58

[56] References Cited

U.S. PATENT DOCUMENTS

| | | | |
|---|---|---|---|
| 2,609,835 | 9/1952 | Horvay | 251/65 |
| 3,086,548 | 4/1963 | Gauger et al. | 137/484.8 |
| 3,100,496 | 8/1963 | Reiser | 137/557 |
| 3,265,062 | 8/1966 | Hesse | 251/65 |
| 3,348,543 | 10/1967 | Stafford | 251/65 |
| 3,880,008 | 4/1975 | Eilersen | 137/557 |
| 4,074,693 | 2/1978 | Kates | 137/456 |
| 4,562,863 | 1/1986 | Claussen et al. | 137/557 |
| 4,672,728 | 6/1987 | Nimberger | 29/157 |
| 4,763,114 | 8/1988 | Eidsmore | 137/557 |
| 4,893,649 | 1/1990 | Skoglund | 137/504 |
| 4,959,990 | 10/1990 | Morris | 73/202 |
| 5,235,324 | 8/1993 | Gagnebin | 137/557 |
| 5,301,713 | 4/1994 | Skoglund | 137/504 |
| 5,333,642 | 8/1994 | Kemp et al. | 137/557 |
| 5,398,721 | 3/1995 | Pryor | 137/557 |

FOREIGN PATENT DOCUMENTS 797905  7/1958  United Kingdom ................... 137/557

OTHER PUBLICATIONS

W.A. Kates Co "Fundamentals of Flow control operations" Apr. 15, 1991.

Primary Examiner—A. Michael Chambers
Attorney, Agent, or Firm—Michael J. Tavella

[57] ABSTRACT

A self-regulating flow control valve that combines a variable area flow meter and a flow control valve. In one embodiment, a tapered frusto-conical float is installed in a concentric cylinder. This cylinder has an inlet port below the float and an outlet port above the float. Both the inlet and outlet ports are in fluid communication with the cylinder. During normal flows, the float raises and reaches an equilibrium position. The upper portion of the cylinder has a flow tube installed within the tube. The lower portion of this tube acts as a valve seat for the float. The flow tube is set at a particular level of flow. As the flow changes, the float level changes. As the float approaches the flow tube, the flow rate stabilizes at the desired set point due to valving action. The set point can be changed by adjusting the position of the valve flow tube. The flow rate may be read off a scale that can be affixed to the valve body, or by means of graduations formed on the flow tube.

20 Claims, 8 Drawing Sheets

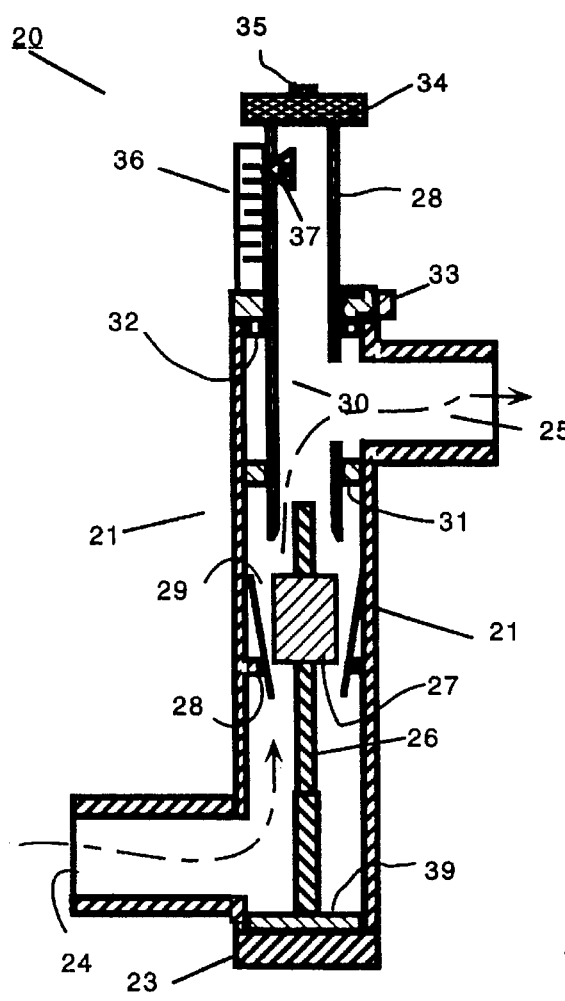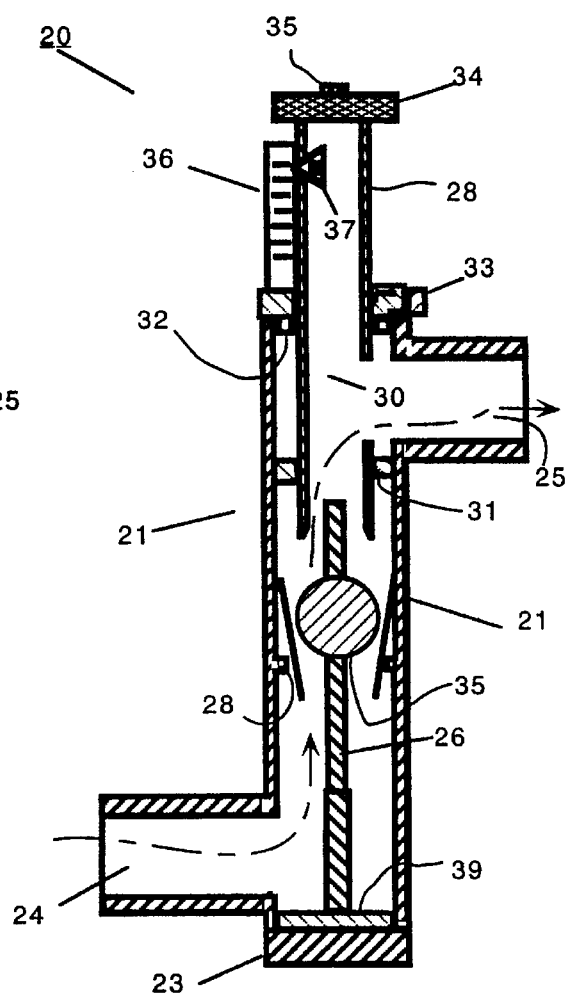
Figure 4
Figure 5

PASSIVE FLOW REGULATING DEVICE

This invention relates to fluid flow regulators and particularly to fluid flow regulators operating independently of the fluctuations in upstream or downstream pressure.

BACKGROUND OF THE INVENTION

In modern complex flow systems, such as a hydronic heating system for a building, hot water or heating fluid is pumped from a central boiler to various zones. After the heat is dissipated from each zone through terminal devices, the zones are combined to form a single header. In each zone it is important to have a constant flow that does not vary with changes in water pressure throughout the system. Such changes may be caused by opening or closing of valves, changes in pumping pressure, or due to other controls. Thus, unless flow regulation is provided, the system tends to get out of balance and the flow in individual zones can vary randomly. Current methods of flow control are costly and complex. Common practice in the art is to use balancing valves. A balancing valve has an adjustable orifice with a differential pressure tap. Adjustments are made using a spindle calibrated with a read out scale. A differential pressure gauge is connected across the downstream and upstream taps. An example of such a device is found in U.S. Pat. No. 4,672,728 to Nimberger. The pressure drop is correlated with the valve setting to indicate flow rate. Typically, one of the balancing valves is installed in each zone of a hydronic system. The balancing process is further complicated because of the possibility that balancing one zone may change the balance in the other zones. Thus, an iterative process of balancing and rebalancing must be done. This balancing is normally done in the field and usually requires expert service and is also time-consuming.

Although improvements have been made to the balancing valves, little success in reducing the work needed to balance the system has been achieved. Flow controllers today generally all have some type of differential pressure sensing. A differential pressure is sensed across a restriction and is used to drive a diaphragm or a piston or to actuate another valve. Most designs involve complex flow passages and fine orifices that tend to become clogged during operation.

Examples of these types of valves are found in U.S. Pat. No. 3,086,548 to Galiger et al., U.S. Pat. No. 4,893,649 to Skoglund, U.S. Pat. No. 4,959,990 to Morris, and U.S. Pat. No. 5,301,713 to Skoglund.

SUMMARY OF THE INVENTION

The present invention overcomes these problems by producing a self-regulating flow control valve. The invention combines the elements of a variable area flow meter and a flow control valve to create the self-adjusting device. In one embodiment, a tapered frusto-conical float is installed in a concentric cylinder. This cylinder has an inlet port below the float and an outlet port above the float. Both the inlet and outlet ports are in fluid communication with the cylinder. During normal flows, the float rises and reach an equilibrium position. The upper portion of the cylinder has a flow tube installed within the tube. The lower portion of this tube acts as a valve seat for the float. The flow tube is typically set at and/or is adjusted to a desired level of flow. As the flow changes, the float level changes. As the float approaches the flow tube, the valving action between the float and the flow tube stabilizes the flow rate at the desired set point. The set point can be changed by adjusting the position of the flow tube. The flow rate may be read off a scale that can be affixed to the valve body, or by means of graduations formed on the flow tube.

In another embodiment, the tapered float may contain a permanent magnet. In this embodiment, the float position may be read off a magnetically-coupled scale outside the flow area, similar to a conventional magnetic rotameter. In this embodiment, valving action is the same as in the first embodiment.

In a third embodiment, a cylindrical (or spherical) float moves within a tapered flow passage as in a variable area flow meter, using the same valving action as in the other embodiments, for flow control. The float may have any of the conventional shapes used in a variable area flow meter.

In all of the embodiments, a spring may be added to stabilize the float movement and to handle higher flow capacities.

It is an object of this invention to develop a flow control regulator that can be used in the field without a separate read-out device.

It is another object of this invention to develop a flow control regulator that can be used in the field without a separate flow control loop.

It is yet another object of this invention to develop a flow control regulator that can be adjusted in the field without the need of a differential pressure sensing device.

It is yet a further object of this invention to develop a flow control regulator that regulates the flow of fluids without the need for diaphragms or other differential biasing means, such as springs.

It is a further object of this invention to develop a flow control regulator that does not utilize narrow flow passages that may become clogged, thereby causing the regulator to fail to operate properly.

It is another object of this invention to develop a flow control regulator that can be quickly set and adjusted in the field by less skilled technicians.

BRIEF DESCRIPTION OF THE DRAWINGS

FIG. 4 is a cross-sectional view of a second embodiment of the invention showing the float as a cylinder and the flow chamber being tapered.

FIG. 5 is a cross-sectional view of the invention showing the float as a ball, at its low point.

DETAILED DESCRIPTION OF THE INVENTION

Figure 1:
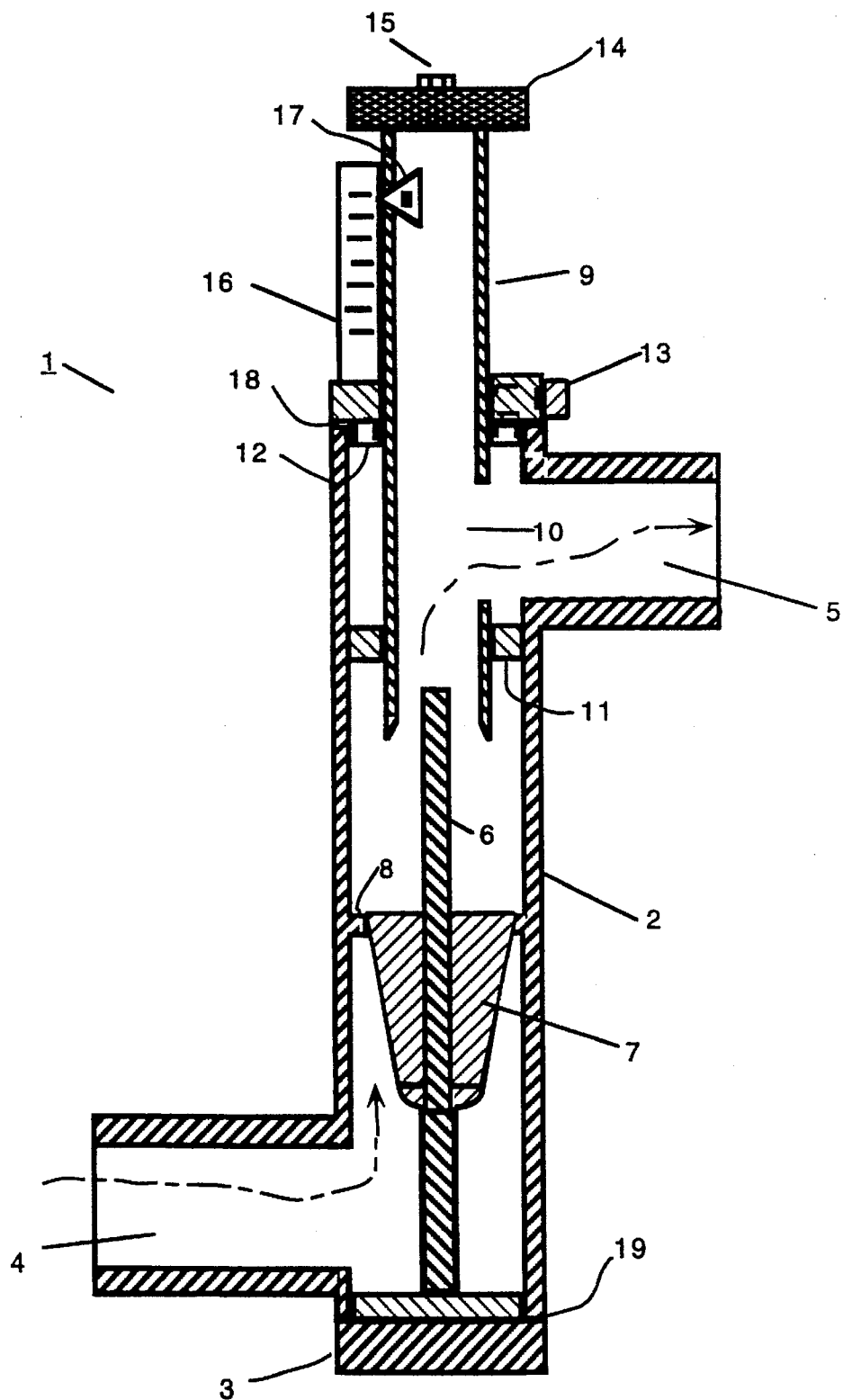
FIG. 1 is a cross-sectional view of the invention showing the tapered float at its low point.
Figure 10:
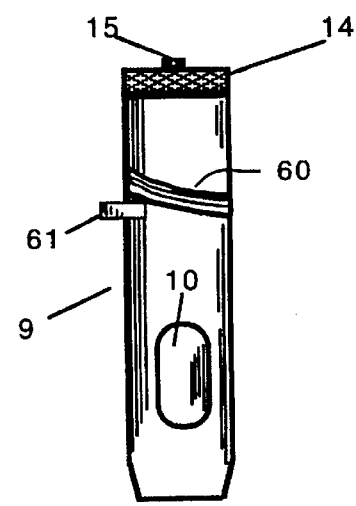
FIG. 10 is a detail view of the flow tube having a cam formed on the outer wall of the flow tube as a vertical adjustment mechanism.
Figure 11:
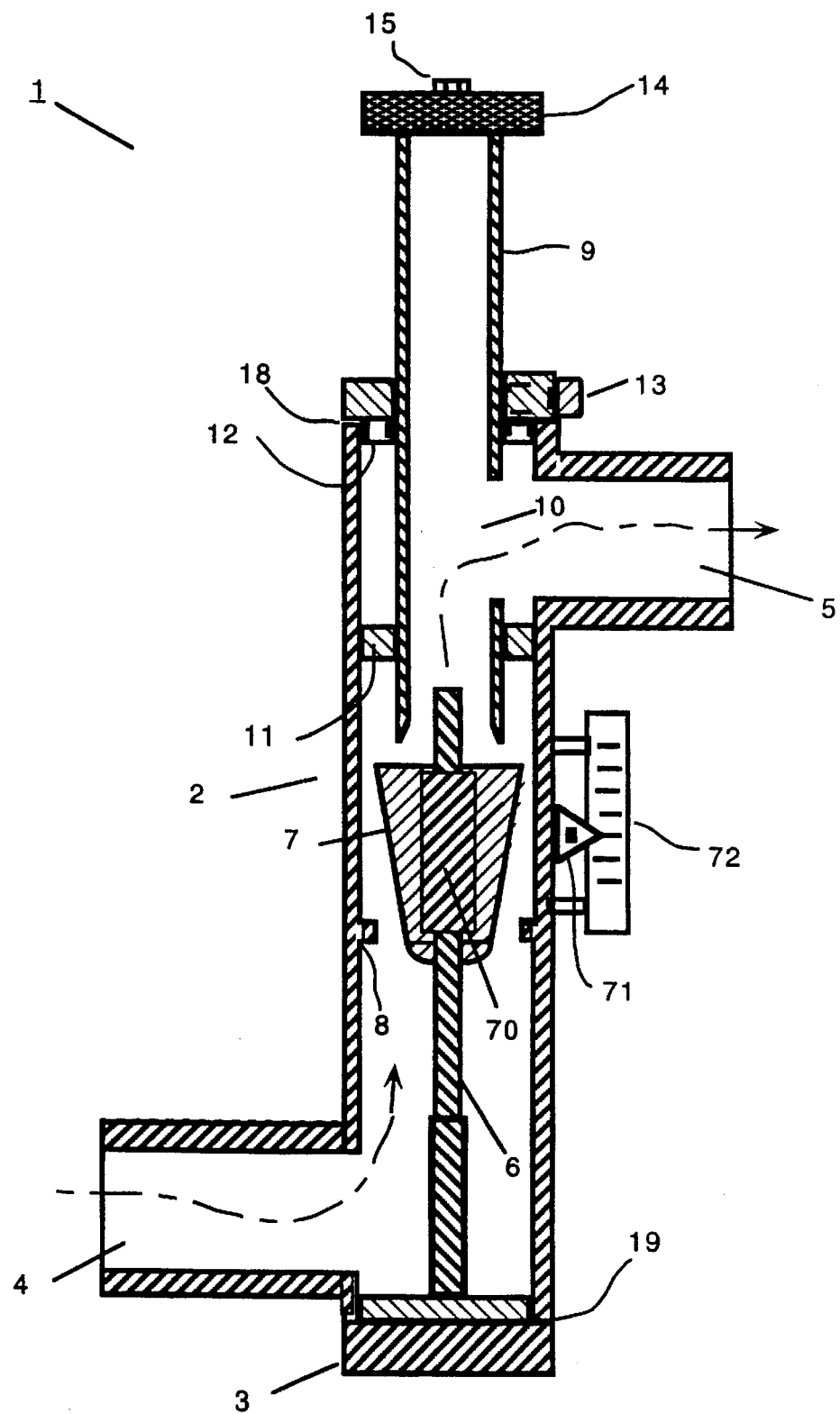
FIG. 11 is a cross-sectional view of the invention using a magnetic scale system to indicate flow levels.

Referring now to FIG. 1, a cross-sectional view of the invention with a float 7 at the bottom of its travel, is shown. The flow valve 1 has an outer case 2. The case is sealed at the bottom with a plug 3. An inlet port 4 is provided as shown. An outlet port 5 is provided in the case 2 as shown. A guide rod 6 is provided in the case 2 as shown. The purpose of the guide rod 6 is to align the float 7. The float 7 is designed to slide up and down on the guide rod 6 as the flow within the flow meter varies. A lower support ring 8 prevents the float 7 from dropping down to the bottom plug 3 of the case 2. A flow tube 9 is installed within the upper portion of the case 2. The flow tube 9 is cylindrical (but it can be any shape desired). An outlet opening 10 is provided as shown. A lower plug 11 is provided to secure the flow tube 9 in position and to seal the upper portion of the case 2 so that fluid flow is directed into the flow tube 9 and out through the outlet opening 10. An upper plug 12 is provided to seal the top of the case 2. A set screw 13 is used to secure the position of the flow tube 9 at the desired position, once that position has been established. A knob 14 is provided at the top of the flow tube 9 to allow the height of the flow tube 9 within the case 2, to be adjusted. A nut 15 is used to hold the knob 14 in place. Any other suitable fastener can be used, however, to secure the knob 14. A graduated scale 16 is attached to the case as shown. A pointer 17 is provided so that the flow can be read directly from the scale 16. FIGS. 10 and 11 show alternative adjustment mechanisms, which are discussed below. Seals 18 and 19 are provided as shown.

Figure 2:
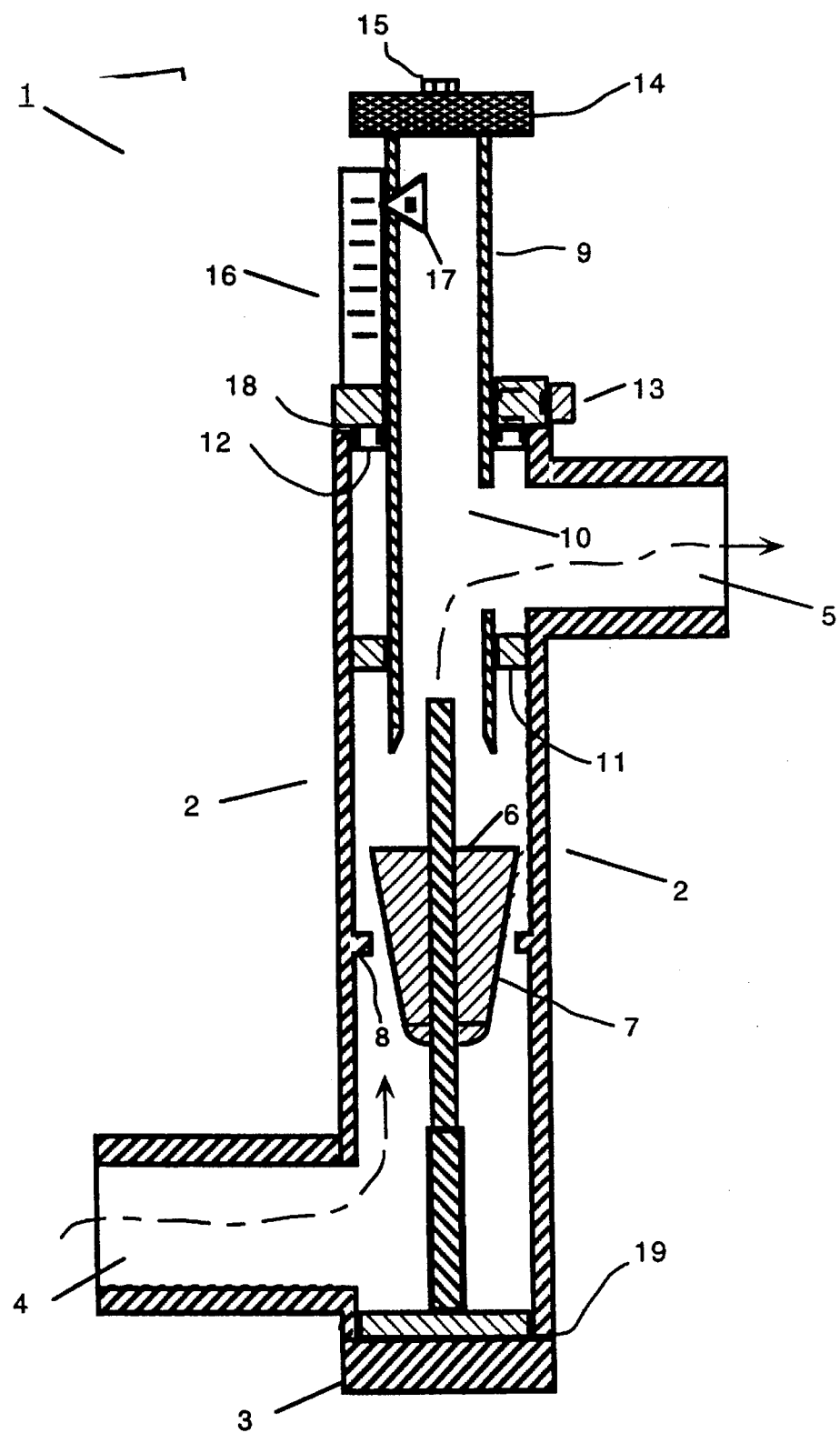
FIG. 2 is a cross-sectional view of the invention showing the tapered float at an intermediate flow point.
Figure 3:
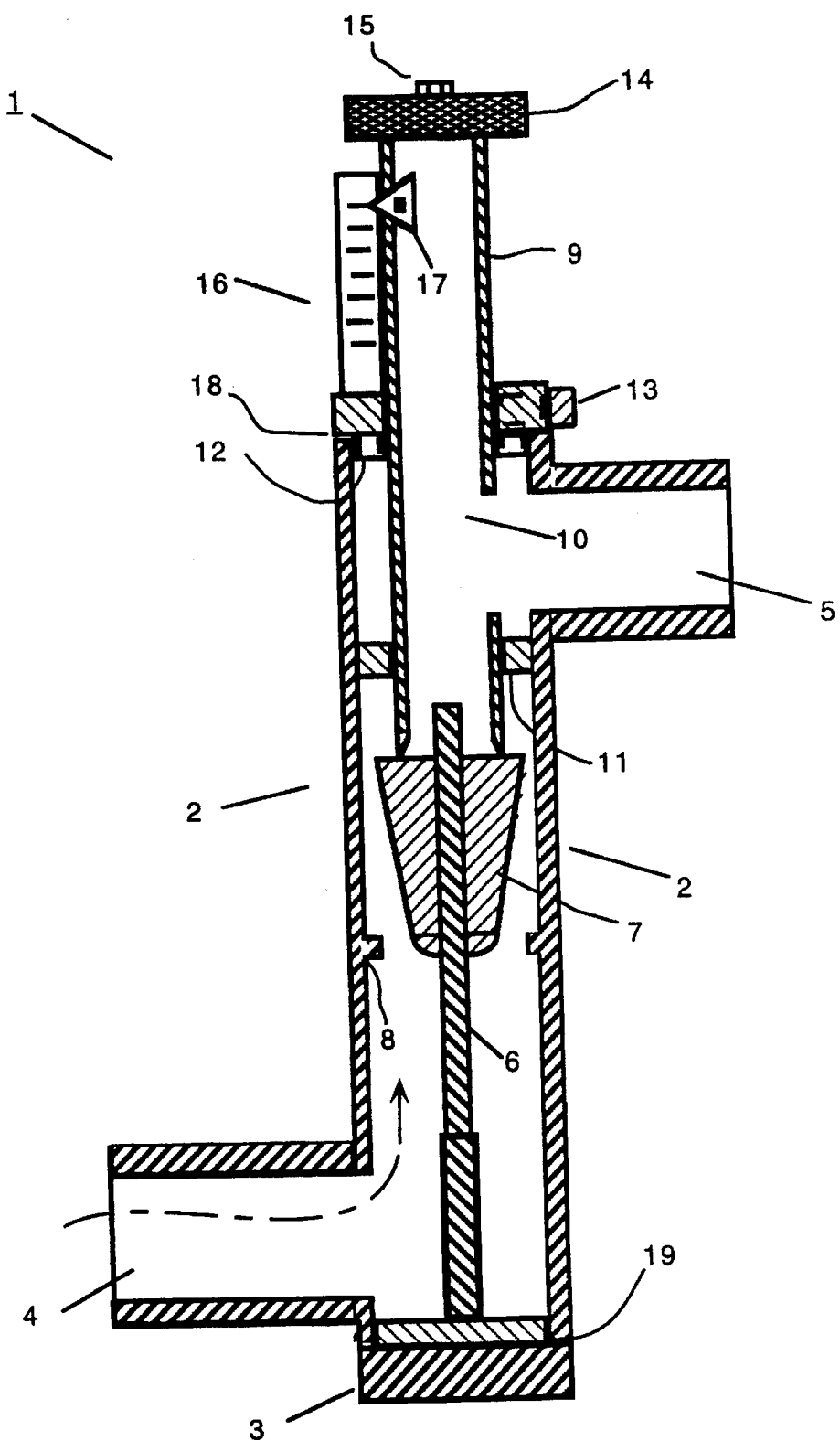
FIG. 3 is a cross-sectional view of the invention showing the tapered float at the top of its travel for the particular flow tube setting shown.

In use, the float 7 moves within the case 2. FIG. 1 shows the position of the float 7 near the bottom of its travel. This indicates a low flow condition. As the flow increases, the float 7 rises to an intermediate position as shown in FIG. 2. During normal operations, the float 7 typically remains near this position. As flow increases, the float 7 continues to rise, until it strikes the bottom of the flow tube 9. This position is shown in FIG. 3. At this point, the flow is cut off. Under normal operations, this position is never reached. Rather, as the flow increases, the float 7 approaches the bottom of the flow tube 9. As this happens, the passage begins to become constricted. Thus, as the float 7 rises, the constriction automatically restricts the flow, thereby causing a reduction in the output, which ultimately leads to a reduction of flow through the input, which lowers the float 7 to a more normal operating position.

Referring now to FIG. 4, a second embodiment of the invention is shown. In this embodiment, the flow valve 20 has the same basic components as the first embodiment, with one key difference. In this embodiment, the flow valve 20 has an outer case 21. The case 21 is sealed at the bottom with a plug 23. An inlet port 24 is provided as shown. An outlet port 25 is provided in the case 21 as shown. A guide rod 26 is provided in the case 2 as shown. The purpose of the guide rod 26 is to hold the float 27. The float 27 is designed to slide up and down on the guide rod 26 as the flow within the flow meter varies.

A flow tube 28 is installed within the upper portion of the case 21. The flow tube 28 is cylindrical (but it can be any shape desired). An outlet opening 30 is provided as shown. A lower plug 31 is provided to secure the flow tube 28 in position and to seal the upper portion of the case 21 so that fluid flow is directed into the flow tube 28 and out through the outlet opening 30. An upper plug 32 is provided to seal the top of the case 21. A set screw 33 is used to secure the position of the flow tube 28 at the desired position, once that position has been established. A knob 34 is provided at the top of the flow tube 28 to allow the height of the flow tube 28 within the case 21, to be adjusted. A nut 35 is used to hold the knob 34 in place. Any other suitable fastener can be used, however, to secure the knob 34. A graduated scale 36 is attached to the case 21 as shown. A pointer 37 is provided so that the flow can be read directly from the scale 36. As noted, these components are identical to those of the first embodiment.

The major difference in this embodiment is the float 27 and the float channel 29. In the first embodiment, the float 7 is a tapered cylinder that rides in a vertical cylindrical channel within the case 2. In the second embodiment, as shown in FIG. 4, the float 27 is a vertical cylinder that rides in a tapered channel 29, formed within the case 21. This cylindrical float 27 operates in the identical manner as the float 7. The tapered channel 29 provides the equivalent variable area as the tapered float 7 provides in the first embodiment.

FIG. 5 shows yet another embodiment. This embodiment, a ball shaped float 35 is shown. Operation of the device, and the basic components are identical to the other embodiments.

Figure 6:
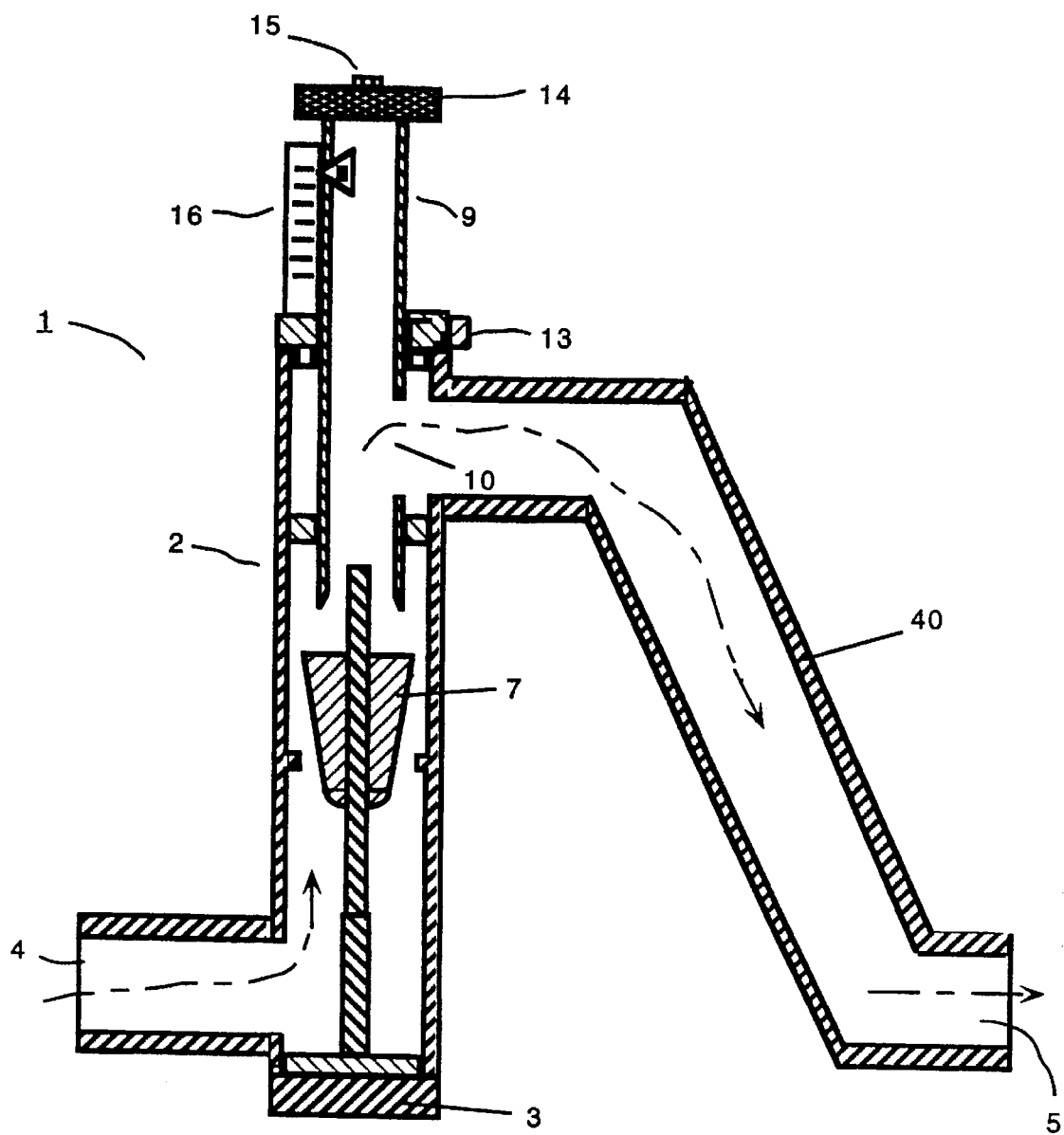
FIG. 6 is a cross-sectional view of an embodiment of the invention showing the outlet being piped to the same level as the inlet.

Referring now to FIG. 6, a channeled outlet 40 is provided. In this embodiment, the outlet port 5 is dropped down to the level of the inlet port 4. This modification conforms to industry standard where the outlet and inlet at the same height, for plumbing convenience. In this embodiment, the channeled outlet 40 is attached to the outlet port 5 as shown. The channeled outlet 40 automatically redirects to flow to the level of the inlet port 4. Alternatively, the inlet port 4 can be raised to be in line with the outlet port 5.

Figure 7:
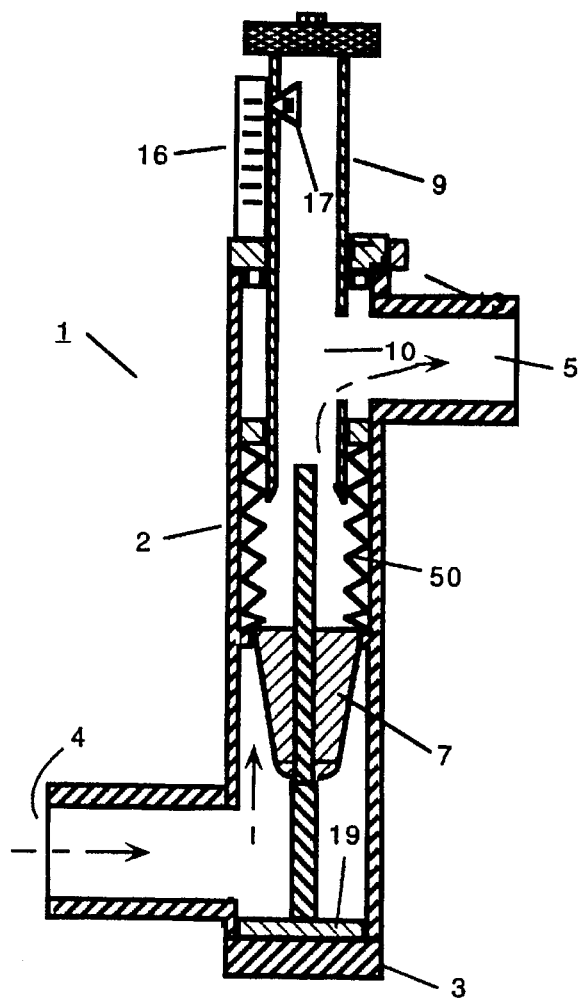
FIG. 7 is a cross-sectional view of another embodiment of the invention showing the float being biased by a spring to handle high flows.

FIG. 7 shows the float 7 biased by a biasing spring 50. The biasing spring 50 is needed only if the device is used at higher flow rates. The biasing spring 50 keeps the float 7 from being excessively forced upward due to the increased flows. The use of the biasing spring 50 eliminates the need to weight the float 7 to restrict its displacement.

Figure 8:
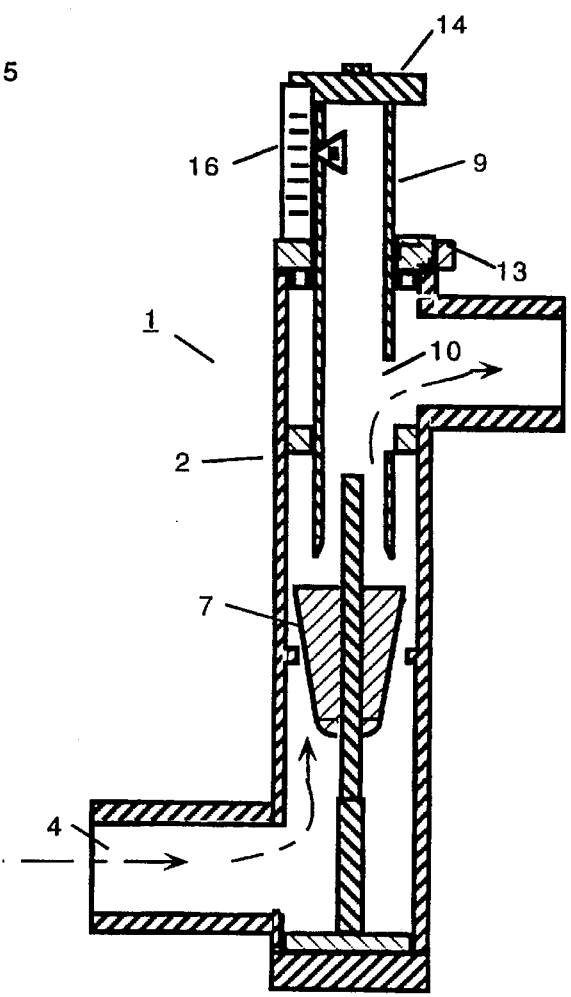
FIG. 8 is a cross-sectional view of the invention showing the flow tube at a lower setting, showing the lower flow rate reading on the scale.

FIG. 8 shows the flow tube 9 at a lower level than that of the earlier figures. Setting the flow tube 9 to a lower level automatically restricts the flow through the device as the float 7 cannot rise past the bottom of the flow tube 9, as discussed above. The flow tube 9, in this embodiment, is slid into position. The flow tube 9 is held in place by a set screw 13 as shown.

Figure 9:
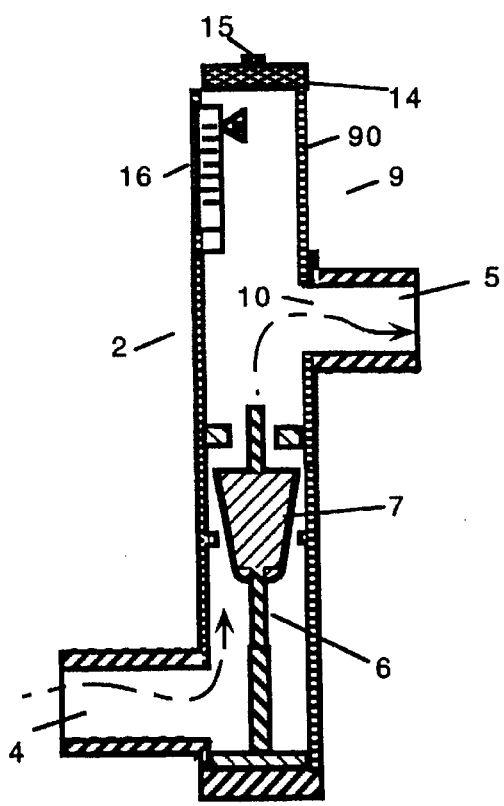
FIG. 9 is a cross-sectional view of the invention showing the flow tube having a threaded body for vertical adjustment.

FIG. 9 shows one alternative means of positioning the flow tube 9. In this embodiment, the flow tube 9 is threaded and its threads match those formed in the cylindrical case 2. The height is adjusted by simply turning the top of the flow tube 9 as desired. This type of adjustment mechanism can also be used with the embodiment of FIGS. 4 and 5.

FIG. 10 shows yet another means of adjusting the height of the flow tube 9. In this embodiment, a cam 60 is formed on the surface of the flow tube 9 as shown. A cam follower 61 is positioned as shown and is secured to the case. As the flow tube 9 is turned, the cam 60 rides on the cam follower 61 causing the flow tube 9 to rise or fall according to the angle of the cam 60.

Referring now to FIG. 11, a third embodiment of the device is shown. Here, the flow readings are done using magnetic readings. A small magnet 70 is embedded in the float 7 as shown. A magnetically coupled indicator 71 is placed in close proximity to the case, whereby magnetic coupling can be achieved. On the indicator 71 is coupled to the magnet 70, the indicator 71 rises and falls in concert with the magnet 70 in the float 7, providing continuous flow readings. The flow can then be read off a scale plate 72 positioned near the pointer as shown.

In all embodiments, the case and components are made of steel or similar metals as is common to this art. The floats are made of appropriate materials, such as rubbers or other plastics.

To use the device, the device is placed into the plumbing line at an appropriate locations. The flow tube 9 or 28 is then adjusted to the preferred flow level and locked into place. Once set, the device automatically operates to maintain proper flows through the valve. Adjustments can be made by raising or lowering the flow tube 9 or 28 as needed.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A self-regulating flow control valve comprising:
    a) an outer case, having an interior;
    b) an inlet port, fixedly installed on the outer case;
    c) an outlet port, fixedly installed on the outer case, wherein the outlet port is spaced apart from said inlet port, forming an open channel therebetween;
    d) a float, slidably placed within said outer case and being interposed between said inlet port and said outlet port within said open channel, and having a vertical travel, said float also having a valve seat surface, wherein said valve seat surface is aligned with said outlet port such that said valve seat surface acts as a valve seat within said self-regulating flow control valve;
    e) means for moving said float in proportion to a flow of fluid through said outer case, wherein said means for moving said float includes a variable flow area formed in said open channel, such that said float, operating within said open channel, acts to control the flow of fluid through said self-regulating flow control valve; and
    f) an adjustable means for restricting the vertical travel of said float within said outer case.

2. The self-regulating flow control valve of claim 1 wherein the float has a frusto-conical shape; and the interior of the outer case is cylindrical.

3. The self-regulating flow control valve of claim 1 wherein the float is cylindrical; and the interior of the outer case is tapered.

4. The self-regulating flow control valve of claim 1 wherein the float is a ball.

5. The self-regulating flow control valve of claim 1 wherein the adjustable means for restricting the vertical travel of said float within said outer case comprises:
    a) a tube, having an outlet opening formed therein, said tube being slidably placed within said outer case; and
    b) means for adjustably securing said tube in a fixed position within said outer case.

6. The self-regulating flow control valve of claim 1 wherein the adjustable means for restricting the vertical travel of said float within said outer case comprises:
    a) a tube, having an outlet opening formed therein, said tube having a plurality of threads formed thereon; and
    b) a plurality of corresponding threads formed on the interior of said outer case, such that the plurality of threads on said tube engage the plurality of threads on said interior of said outer case.

7. The self-regulating flow control valve of claim 1 wherein the adjustable means for restricting the vertical travel of said float within said outer case comprises:
    a) a tube, having an outlet opening formed therein, said tube having a cam formed thereon; and
    b) a cam follower, fixedly attached to the interior of said outer case, such that said cam is in communication with said cam follower such that as said tube is turned, said cam forces the tube upwards or downwards.

8. The self-regulating flow control valve of claim 1 wherein the inlet port and the outlet port are in an identical horizontal plane.

9. The self regulating flow control valve of claim 1 further comprising a biasing spring, placed above said float, within said outer case; and means for restraining said biasing spring in said outer case.

10. The self-regulating flow control valve of claim 1 further comprising: a magnetic flow level indicator including a magnet, fixedly placed within said float; a sliding indicator pointer, magnetically coupled to said magnet; and an indicator scale in communication with said sliding indicator pointer.

11. The self-regulating flow control valve of claim 1 further comprising a means for indicating flow level through said flow control valve, being adjustably attached to said flow control valve.

12. The self-regulating flow control valve of claim 11 wherein said means for indicating flow level through said flow control valve comprise:
    a) an indicator pointer, fixedly attached to said adjustable means for restricting the vertical travel of said float within said outer case; and
    b) a readout scale, fixedly attached to said outer case, and positioned thereon such that the indicator pointer is aligned with said readout scale.

13. A self-regulating flow control valve comprising:
    a) an outer case, having an interior;
    b) an inlet port, fixedly installed on the outer case;
    c) an outlet port, fixedly installed on the outer case;
    d) a float, having a frusto conical shape, slidably placed within said outer case and being interposed between said inlet port and said outlet port and having a vertical travel, such that said float operating within said open channel, acts to control the a flow of fluid through said self-regulating flow control valve;
    e) means for restraining the vertical travel of said float;
    f) an adjustable means for restricting the vertical travel of said float within said outer case; and
    g) a means for indicating flow level through said self-regulating flow control valve, being adjustably attached to said self-regulating flow control valve.

14. The self-regulating flow control valve of claim 13 wherein the interior of the outer case is cylindrical.

15. The self-regulating flow control valve of claim 13 wherein the adjustable means for restricting the vertical travel of said float within said outer case comprises:
    a) a tube, having an outlet opening formed therein, said tube being slidably placed within said outer case; and
    b) means for adjustably securing said tube in a fixed position within said outer case.

16. The self-regulating flow control valve of claim 13 wherein the adjustable means for restricting the vertical travel of said float within said outer case comprises:

a) a tube, having an outlet opening formed therein, said tube having a plurality of threads formed thereon; and b) a plurality of corresponding threads formed on the interior of said outer case, such that the plurality of threads on said tube engage the plurality of threads on said interior of said outer case.

17. The self-regulating flow control valve of claim 13 wherein the adjustable means for restricting the vertical travel of said float within said outer case comprises:

a) a tube, having an outlet opening formed therein, said tube having a cam formed thereon; and b) a cam follower, fixedly attached to the interior of said outer case, such that said cam is in communication with said cam follower such that as said tube is turned, said cam forces the tube upwards or downwards.

18. The self regulating flow control valve of claim 13 further comprising a biasing spring, placed above said float, within said outer case; and means for restraining said biasing spring in said outer case.

19. The self-regulating flow control valve of claim 13 wherein the means for indicating flow level through said self-regulating flow control valve comprise: a magnetic flow level indicator including a magnet, fixedly placed within said float; a sliding indicator pointer, magnetically coupled to said magnet; and an indicator scale in communication with said sliding indicator pointer.

20. The self-regulating flow control valve of claim 13 wherein the means for indicating flow level through said flow control valve comprise:

a) an indicator pointer, fixedly attached to said adjustable means for restricting the vertical travel of said float within said outer case; and b) a readout scale, fixedly attached to said outer case, and positioned thereon such that the indicator pointer is aligned with said readout scale.

* * * * *